United States Patent Office 3,131,039
Patented Apr. 28, 1964

3,131,039
PROCESS FOR PREPARING A POLISHING COMPOUND
Frederick C. Nonamaker, 615 N. Brown St., Gloucester City, N.J.
No Drawing. Filed Oct. 12, 1961, Ser. No. 144,537
6 Claims. (Cl. 51—293)

This invention relates to an improved process for preparing a polishing material adapted for use in polishing glass, ceramics, and other glass-like materials. In one specific embodiment it relates to a method for preparing a superior polishing compound from bastnasite.

There is a considerable need for polishing compounds, especially in the glass and ceramic industries. The present commercial polishing compositions are "red rouge," which is a mixture of finely-divided iron oxide, and so-called "white rouge," which is a quartz material. The principal objections to the present materials are that red rouge tends to color the material being polished and also presents problems with damage to clothing of the workers because of the red color of the composition. To avoid this objection, white rouge has been used in some areas. It has not been particularly successful as a substitute because of its rather low polishing efficiency.

In addition to the rouges there are certain other commercially available materials which are used in the glass polishing industry. These materials are highly efficient, but their commercial use on a large scale has been restricted because of the high cost of the materials.

I have found that a highly efficient polishing compound can be prepared at a price competitive to the red rouge of commerce by treating commercially available concentrates of bastnasite in a manner that will result in a low concentration of hydrogen fluoride being present in the furnace atmosphere from the bastnasite ore as it is being fired. The proper atmosphere in the furnace can be obtained by treating commercially available bastnasite with a weak acid or ammonia compound prior to firing, or by slowly injecting hydrogen fluoride or steam into the furnace during firing of the ore. A material having suitable polishing characteristics can also be prepared by treating the concentrate in size reduction apparatus such as a ball mill to reduce the size of the particles and thereafter treating the milled ore with hydrofluoric acid or fluorosilicic acid and firing the treated particles at a temperature above 1000° F.

Bastnasite is a rare earth fluorocarbonate which contains traces of thorium. The mineral is found in deposits in New Mexico and California. The crude ore mined in the California deposit contains about 26% rare earth oxide. In addition the material contains magnesium oxide, calcium oxide, barium oxide, aluminum oxide and iron oxide.

A concentrate of bastnasite is available which has the following approximate compositions:

| | Percent |
|---|---|
| Rare earth oxides | 68.0–70.0 |
| Fluorine | 5.5–6.0 |
| $SiO_2$ | 1.0–1.5 |
| $CO_2$ | 15.0–17.0 |

There are several possible methods of treating this concentrate to produce a satisfactory polishing compound. In the first step of all of these processes, the material is ground in a ball mill or similar device. An acceptable method is to ball mill the materials for a protracted period of time in the presence of water. This will effect size reduction to give a product having an average particle diameter as low as 1 micron. A suitable polishing compound can be made by treating this ball-milled material with hydrofluoric acid or fluosilicic acid in an amount equal to 5–20% by weight of the rare earth content of the ore, preferably 5–10% by weight of the rare earth content, and firing at a temperature of about 1200–1400° F. for a period of 1–2 hours.

An alternate method involves ball milling the material and treating with ammonium sulfate, ammonium nitrate, etc. After treatment, the slurry is filtered and fired without making any effort to remove the ammonium compound. A suitable polishing compound can also be obtained by reducing the size of the concentrate by dry milling the material to a fineness of −325 mesh. The dry powder is then mixed with boric acid and fired at a temperature of about 1200–1400° F. for 1–2 hours.

The proper atmosphere can also be achieved by adding hydrofluoric acid gas or steam to the furnace during firing. In steam treatment, a quantity of steam which is equivalent to the weight of the material should be used. In hydrofluoric acid treatment, a sufficient quantity of hydrofluoric acid gas should be passed through the furnace to reduce the effluent pH to pH 4 or below. Obviously, the most economical method of operation would be to pass sufficient hydrofluoric acid gas through the furnace to keep the pH close to 4. Using an additional amount of hydrofluoric acid gas gives a satisfactory product but unduly increases the cost of the operation.

The examples set out below illustrates methods of effecting the decomposition of rare earth fluorides in the concentrate. Boric acid or the ammonia compounds liberate hydrofluoric acid or boron trifluoride which in turn reacts with the oxide resulting from the thermal decomposition of the carbonates.

One of the principal advantages of the operation of the process is the fact that a superior polishing material can be prepared by firing at relatively low temperatures. Thus, it was found that a treated concentrate could be fired at temperatures in the range of 1000° up to 14,000° F., the preferred temperature being about 1380° F. The material may be fired for periods of about 1–4 hours, preferably for about 80 minutes.

The polishing compounds of this invention were evaluated by determining the abrasive power of each of the compounds and comparing the abrasive power with the same characteristics of commercial compounds. The abrasive power was determined using an automatic bowl feed polishing machine with accessories for polishing 2 inch diameter flat optical glass lens blanks. A minimum of 5 blanks was used for each test with each polishing material. The blanks were finish ground on one surface with a FFF grade silicon carbide and then were weighed in the chemical balance before polishing. Each lens was polished for 10 minutes on the machine using a slurry of 50 grams of solid material with 100 cubic centimeters of water. The counter-weight on the polishing machine was in a forward position for all tests. With the weight in this position, the pressure on the lens was 7.96 pounds per square inch. After polishing, each lens was again weighed and loss of weight determined. The average value of this loss in weight was reported as abrasive power or A.P.

The important limitations as to polishing compounds are melting point, hardness, and size. It is, of course, important that the polishing compound have a melting point above the glass or other material being polished. The particle size of these compounds is also quite important. The particles should be in the 1 to 10 micron range. Good results are obtained when 80% of the material has a particle size of less than 5 microns. The balance having a particle size between 5 and 10 microns.

The invention is illustrated by the following illustrative but non-limiting examples.

EXAMPLE I

The methods of evaluating the effectiveness of the polishing materials were worked out in two runs. In the first of these runs, a 50 gram portion of one of the polishing materials prepared according to the process of my invention and 100 cc. of water were added to a standard polishing wheel and a 1⅞ spectacle lens blank polished. Every 30 seconds the polishing was interrupted. The lens blank was removed, cleaned, and examined under a clear glass incandescent lamp. Starting with a spectacle lens in fine condition using one of the polishing compounds prepared according to my invention, a highly polished brilliant surface containing no pits or lines was obtained in 5 minutes under the same test conditions. It took more than 10 minutes to produce a comparably polished surface with red rouge and even longer to produce a surface of the same quality with white rouge. To illustrate the superior polishing efficiency of the rare earth fluorine compositions of my invention, the abrasive power was determined using the method described above.

EXAMPLE II

The abrasive power is a measure of the number of milligrams in glass removed from a 1⅞ inch spectacle lens blank in 10 minutes using the standard bowl feed polisher described above and with the gradual addition of 15 grams of polishing compound in 100 cc. of water.

The abrasive power of the compositions prepared according to the process of my invention was determined and compared to the results obtained using red rouge and white rouge. The sample used in making this comparison was the sample prepared by the ammonium sulfate technique described below. The comparative results are set out in Table I below.

*Table I*

| Polishing material: | Abrasive power |
|---|---|
| Red rouge | 37 |
| White rouge | 40 |
| Composition prepared in ammonium sulfate process | 51.7 |

It is apparent from an examination of these data that the polishing compound prepared according to the process of my invention is greatly superior to the red rouge and white rouge polishing compounds of the prior art. The various methods which may be used to prepare these polishing compositions are set out in the examples which follow.

EXAMPLE III

A sample of crude bastnasite was treated to determine the possibility of preparing a suitable polishing compound from this material. The crude ore contained considerable quantities of calcium carbonate and barium sulfate. The rare earth oxide content of the ore was about 35%. In the first run of the series, 100 grams of the bastnasite was treated with 50 ml. of 66° Bé. sulfuric acid, dried, and fired at 1700° F. for 2 hours. The crude ore treated in this manner gave an A.P. value of less than 35.

From the data collected in this run, it was felt that the concentrates of this material had definite possibilities as a raw material for preparing polishing compositions.

EXAMPLE IV

A bastnasite rare earth concentrate which is commercially available was used to prepare the polishing compounds in later runs. This concentrate had the following approximate compositions:

| | Percent |
|---|---|
| Rare earth oxides | 68.0–70.0 |
| Fluorine | 5.5– 6.0 |
| $SiO_2$ | 1.0– 1.5 |
| $CO_2$ | 15.0–17.0 |

A 100-gram lot of this material was dry milled to a fineness of 100% —325 mesh. The sample of concentrate was intimately mixed with 10 grams of boric acid powder and the mixture was fired at 1382° F. for 80 minutes. Boric acid was chosen as the treating agent on the theory that it would effect a slower decomposition of the rare earth fluoride in the concentrate and liberate hydrofluoric acid or boron fluoride, which in turn would act upon the oxides resulting from the thermal decomposition of the rare earth carbonate. The product after firing was evaluated and found to give an A.P. value of 41.3. It is apparent from an examination of these data that a polishing compound having properties superior to red rouge can be prepared using the proper amount of boric acid.

In a later run the procedure was duplicated except that the amount of boric acid was increased to 20 grams. The A.P. value was determined as before and found to be 35.9. These data indicate that the addition of a quantity of boric acid in excess of 10% by weight of the concentrate does not increase the A.P. value.

Obviously the optimum amount of boric acid does not exceed 1/10 of the weight of the ore.

EXAMPLE V

The effect of firing time was evaluated in one run using the boric acid treatment. In this run a 100 gram lot of concentrate was dry milled to a fineness of —325 mesh. This portion of the concentrate was intimately mixed with 10 grams of boric acid and fired at 1382° F. for 3 hours. The polishing powder prepared was evaluated and found to have an A.P. value of 42.4.

It is apparent from these data that increasing the firing time from 80 minutes to 3 hours would not result in sufficient improvement in quality of polishing powder to warrant additional cost.

EXAMPLE VI

A shipment of commercial bastnasite concentrate which contained rare earths was used in the series of runs using the techniques of my process. The material had a fineness of —325 mesh.

In the first run, the concentrate was wet ball milled for a period of 19 hours. The material after this treatment had an average particle diameter of 5.5 microns. The slurry from the ball mill was filtered and the cake dried. A 100-gram sample of the dry material was treated with 10 grams of boric acid and intimately mixed using the techniques described in Example IV. The boric acid concentrate mixture was fired at 1382° F. for 80 minutes. The product was evaluated and found to have an A.P. value of 43.4.

It is apparent from these data that by using appropriate size reduction techniques a polishing powder, considerably better than red rouge, can be prepared from bastnasite ore concentrates.

EXAMPLE VII

The effect of size reduction alone was investigated in 2 runs in which the concentrate was wet ball milled for a period of 60 hours. The slurry was removed from the equipment, filtered, and dried. The powder had an average particle diameter of less than 2.5 microns. A 100-gram lot of the dry cake was fired at 1382° F. in a tray which was covered to obtain a greater concentration of the gas evolved in the firing. Firing was continued for a period of 80 minutes. The A.P. value of the product was determined and found to be 45.2. This same course of action was continued in a subsequent run in which the concentrate was wet ball milled for a period of 90 hours. The slurry was filtered and dried as before. The dried cake was found to be composed of particles with an average diameter of less than 1.2 microns. A portion of the slurry was filtered and the cake was fired wet in a covered tray at 1382° F. for 80 minutes. The A.P. value of the product was determined and found to be 48.5.

The value of size reduction is emphasized by the improvement in A.P. value resulting from size reduction alone without any additional treatment.

EXAMPLE VIII

The data collected above in the second run of Example VII indicated that there was an improvement in the product after firing was carried out in the atmosphere of steam. This phenomenon was investigated in the run in which a 100-gram lot of the ore that had been wet ball milled for 90 hours and had an average particle diameter of less than 1.2 microns was fired at 1382° F. for 80 minutes. During the firing a gentle current of steam was passed through the furnace to facilitate evolution of hydrofluoric acid from the fluorides in the concentrate. The product was evaluated and found to have an A.P. value of 50.4.

These data indicate that utilization of the fluoride being evolved in the firing step results in a product with improved properties.

EXAMPLE IX

Since the data in Example VIII indicated that using steam facilitated the evolution of fluoride in the formation of hydrofluoric acid from the fluorides in the concentrate, the use of an atmosphere of hydrofluoric acid was investigated.

The conditions were comparable to the conditions set out in Example VIII. The ore was wet milled as before and during firing a gentle current of hydrofluoric acid gas was passed through the furnace. The concentration of hydrofluoric acid gas was regulated by a constant check of the pH of the effluent from the furnace. A stream of hydrofluoric acid gas was passed through the furnace which gave a continuous pH of less than 4. The product was evaluated and found to have an A.P. value comparable to the product of Example VIII.

EXAMPLE X

The effect of additional size reduction was evaluated in a run in which the concentrate was wet ball milled for a period of 180 hours. A portion of this material was dried and the average particle diameter determined. The dry material from this milling was found to have an average particle diameter of one micron. The material in the form of a wet cake was fired in a covered tray for a period of 80 minutes at 1382° F. The A.P. value of the product was determined and found to be 50.4.

It is apparent from these data that no appropriate size reduction is achieved by increasing the ball milling time from 90 to 180 hours. The product prepared from this material had the same A.P. value as the product prepared when the steam was furnished to the ore during the firing cycle from an outside source.

EXAMPLE XI

The effect of treatment of the bastnastite ore concentrate with an ammonium salt was investigated. In this run a 250 ml. lot of a slurry of the wet ball milling where the ball milling had been continued for a period of 60 hours was stirred at room temperature with 40 grams of ammonium sulfate for a period of 40 hours. The slurry was filtered and fired without washing or drying at a temperature of 1382° F. for a period of 80 minutes in a covered tray. The product was evaluated and found to have an A.P. value of 51.7.

A 250 ml. lot of the same slurry was treated in the same manner except that no ammonium sulfate was added. The product of this run had an A.P. value of only 43.2.

It is apparent from a review of these data that a greatly superior polishing compound can be prepared by a combination of ball milling the ore concentrate in treatment with an ammonium salt such as ammonium sulfate. This product was greatly superior to both red rouge and white rouge in polishing characteristics.

Obviously, many modifications and variations of the invention, as hereinabove set forth, may be made without departing from the essence and scope thereof, and only such limitations should be applied as indicated in the appended claims.

What is claimed is:

1. The method of preparing a polishing material which comprises treating a concentrate of a bastnasite which contains at least 65% rare earth oxides by wet milling until 80% of the material has a particle size of less than 5 microns followed by firing the wet concentrate in an atmosphere of hydrofluoric acid gas at a temperature of 1000 to 1400° F. for a period of 1 to 4 hours and recovering the polishing material as a product.

2. The method of preparing a polishing material which comprises treating a concentrate of bastnasite containing at least 65% rare earth oxides which comprises treating by wet milling until 80% of the material has a particle size of less than 5 microns followed by firing the wet concentrate in the presence of steam at a temperature of about 1400° F. for a period of 1½ hours, and recovering the polishing material as a product.

3. A process for preparing a polishing material from a concentrate of bastnasite which contains at least 65% rare earth oxides by wet milling until 80% of the material has a particle size of less than 5 microns commingling with the concentrate a quantity of boric acid equal to about 10% of the weight of the concentrate followed by firing the mixture at a temperature of 1000° to 1400° F. for a period of 1 to 4 hours and recovering the polishing material as a product.

4. A process for preparing a polishing material from a concentrate of bastnasite which contains at least 65% rare earth oxides by wet milling until 80% of the material has a particle size of less than 5 microns commingling with the concentrate a quantity of boric acid equal to 10% of the weight of the concentrate followed by firing the mixture at a temperature of about 1400° F. for a period of one and one half hours, and recovering the polishing material as a product.

5. The method of preparing a polishing compound from a concentrate of bastnasite which contains at least 65% rare earth oxides which comprises milling the concentrate until 80% of the material has a particle size of less than 5 microns, stirring the concentrate with an aqueous solution containing a quantity of ammonium sulfate equal to about 10% of the weight of the concentrate, separating the solids from the mixture, firing said solids at a temperature of 1000 to 1400° F. for a period of 1 to 4 hours and recovering the polishing material as a product.

6. The method of preparing a polishing compound from a concentrate of bastnasite which contains at least 65% rare earth oxides which comprises milling the concentrate until 80% of the material has a particle size of less than 5 microns, stirring the concentrate with an aqueous solution containing a quantity equal to about 10% of the weight of the concentrate of a material selected from the group consisting of hydrofluoric acid and fluosilicic acid, separating the solids from the mixture, firing said solids at a temperature of 1000 to 1400° F. for a period of 1 to 4 hours and recovering the polishing material as a product.

References Cited in the file of this patent

UNITED STATES PATENTS

| | | |
|---|---|---|
| 1,802,242 | Fink et al. | Apr. 21, 1931 |
| 1,819,770 | D'Ans | Aug. 18, 1931 |
| 2,076,080 | George et al. | Apr. 6, 1937 |
| 2,900,231 | Kremers et al. | Aug. 18, 1959 |
| 2,973,246 | Harman et al. | Feb. 28, 1961 |
| 3,051,547 | Bielecki | Aug. 28, 1962 |